(12) United States Patent  
Fallah et al.

(10) Patent No.: US 7,895,420 B2  
(45) Date of Patent: Feb. 22, 2011

(54) SYSTEM AND METHOD FOR ELIMINATING COMMON SUBEXPRESSIONS IN A LINEAR SYSTEM

(75) Inventors: Farzan Fallah, San Jose, CA (US); Anup Hosangadi, Goleta, CA (US); Ryan C. Kastner, Carpinteria, CA (US)

(73) Assignee: Fujitsu Limited, Kawasaki (JP)

( * ) Notice: Subject to any disclaimer, the term of this patent is extended or adjusted under 35 U.S.C. 154(b) by 1266 days.

(21) Appl. No.: 11/067,357

(22) Filed: Feb. 25, 2005

(65) Prior Publication Data

US 2006/0294169 A1    Dec. 28, 2006

Related U.S. Application Data

(60) Provisional application No. 60/612,389, filed on Sep. 23, 2004.

(51) Int. Cl.
G06F 9/30 (2006.01)
G06F 17/14 (2006.01)
G06F 15/00 (2006.01)

(52) U.S. Cl. .............. 712/226; 712/221; 708/405; 708/402

(58) Field of Classification Search .................. None
See application file for complete search history.

(56) References Cited

PUBLICATIONS

S.Vrudhula, "Advanced Logis Synthesis and Verification Algorithms Multi-Level Logic Optimization", Mar. 2003, The University of Arizona.*

A. Hosangadi, F. Fallah, and R. Kastner, "Common Subexpression Elimination Involving Multiple Variables for Linear DSP Synthesis," 11 pages.

M. Potkonjak, M.B. Srivastava, and A.P. Chandrakasan, "Multiple Constant Multiplications: Efficient and Versatile Framework and Algorithms for Exploring Common Subexpression Elimination," *IEEE Transactions on Computer Aided Design of Integrated Circuits and Systems*, cover page and pp. 151-165, 1996.

R. Paško, P. Schaumont, V. Derudder, V. Vernalde, and D. Durackova, "A New Algorithm for Elimination of Common Subexpressions," *IEEE Transactions on Computer Aided Design of Integrated Circuits and Systems*, pp. 58-68, 1999.

I.C. Park and H.J. Kang, "Digital Filter Synthesis Based on an Algorithm to Generate all Minimal Signed Digit Representations," *Computer-Aided Design of Integrated Circuits and Systems, IEEE Transactions*, vol. 21, pp. 1525-1529, 2002.

H.T. Nguyen and A. Chattejee, "Number-Splitting with Shift-and-Add Decomposition for Power and Hardware Optimization in Linear DSP Synthesis," *Very Large Scale Integration (VLSI) Systems, IEEE Transactions*, vol. 8, pp. 419-424, 2000.

(Continued)

*Primary Examiner* — Lewis A Bullock, Jr.
*Assistant Examiner* — Mark A Gooray
(74) *Attorney, Agent, or Firm* — Baker Botts L.L.P.

(57) ABSTRACT

A method for reducing operations in a processing environment is provided that includes generating one or more binary representations, one or more of the binary representations being included in one or more linear equations that include one or more operations. The method also includes converting one or more of the linear equations to one or more polynomials and then performing kernel extraction and optimization on one or more of the polynomials. One or more common subexpressions associated with the polynomials are identified in order to reduce one or more of the operations.

16 Claims, 3 Drawing Sheets

OTHER PUBLICATIONS

M. Mehendale, S.D. Sherlekar, and G. Venkatesh, "Synthesis of Multiplier-less FIR Filters with Minimum Number of Additions," *Proceedings of the ICCAD*, 1995.

R.I. Hartley, "Subexpression Sharing in Filters Using Canonic Signed Digit Multipliers," *Circuits and Systems II: Analog and Digital Signal Processing, IEEE Transactions on [see also Circuits and Systems II: Express Briefs. IEEE Transactions]*, vol. 43, cover page and pp. 677-688, 1996.

H. Safiri, M. Ahmadi, G.A. Jullien, and W.C. Miller, "A New Algorithm for the Elimination of Common Subexpressions in Hardware Implementation of Digital Filters by Using Genetic Programming," *Proceedings of the Application-Specific Systems, Architectures, and Processors, Proceedings, IEEE International Conference*, cover page and pp. 319-328, 2000.

R.K. Brayton, R. Rudell, A.S. Vincentelli, and A. Wang, "Multi-Level Logic Optimization and the Rectangular Covering Problem," *Proceedings of the International Conference on Computer Aided Design*, cover page, p. xvi, and pp. 66-69, 1987.

\* cited by examiner

FIG. 7

| | | KERNEL – COKERNEL MATRIX | | | | | |
|---|---|---|---|---|---|---|---|
| | | 1 | 2 | 3 | 4 | 5 | 6 |
| | | $X_1$ | $X_1L_2$ | $X_2$ | $X_2L$ | $X_2L_2$ | $X_1L$ |
| COKERNELS | 1 | 1 | 1(1) | 1(2) | 1(3) | 1(4) | 1(5) | 0 |
| | 2 | L | 0 | 0 | 1(4) | 1(5) | 0 | 1(2) |
| | 3 | $L^2$ | 1(2) | 0 | 1(5) | 0 | 0 | 0 |
| | 4 | $L^2$ | 1(6) | 0 | 1(7) | 1(8) | 0 | 0 |

| | | KERNEL – COKERNEL MATRIX | | | | | |
|---|---|---|---|---|---|---|---|
| | | 1 | 2 | 3 | 4 | 5 | 6 |
| | | $D_1$ | $X_1L_2$ | $X_2L_2$ | $X_1$ | $X_2$ | $X_2L$ |
| | 1 | 1 | 1(1) | 1(2) | 1(3) | 0 | 0 | 0 |
| | 2 | $L^2$ | 0 | 0 | 0 | 1(2) | 1(3) | 0 |
| | 3 | 1 | 0 | 0 | 0 | 1(5) | 1(6) | 1(7) |

⇩

$X_1 + X_2$

SYSTEM AND METHOD FOR ELIMINATING COMMON SUBEXPRESSIONS IN A LINEAR SYSTEM

RELATED APPLICATIONS

This application claims the priority under 35 U.S.C. §119 of provisional application Ser. No. 60/612,389 filed Sep. 23, 2004.

TECHNICAL FIELD OF THE INVENTION

The present invention relates generally to digital signal processor (DSP) design and, more particularly, to a system and a method for eliminating common subexpressions in a linear system.

BACKGROUND OF THE INVENTION

The proliferation of integrated circuits has placed increasing demands on the design of digital systems included in many devices, components, and architectures. The number of digital systems that include integrated circuits continues to steadily increase and may be driven by a wide array of products and systems. Added functionalities may be implemented in integrated circuits in order to execute additional tasks or to effectuate more sophisticated operations in their respective applications or environments.

In the context of processing, present generation embedded systems have stringent requirements on performance and power consumption. Many embedded systems employ digital signal processing (DSP) algorithms for communications, image processing, video processing etc, which can be computationally intensive. These algorithms each include and implicate any number of processing operations. The required processing operations (e.g. multiplication, addition, shift, etc.) is tantamount to any proposed processing optimization. Moreover, it is the operations that dictate the demands, capacity, and capabilities of any given system architecture or configuration. Accordingly, the ability to reduce these operations to achieve optimal processing provides a significant challenge to system designers and component manufacturers alike.

SUMMARY OF THE INVENTION

From the foregoing, it may be appreciated by those skilled in the art that a need has arisen for an improved processing approach for minimizing the number of operations. In accordance with the present invention, techniques for reducing operations in a linear system are provided. According to specific embodiments, these techniques can optimize a given set of equations by eliminating any number of common subexpressions involving multiple variables.

According to a particular embodiment, a method for reducing operations in a processing environment is provided that includes generating one or more binary representations, one or more of the binary representations being included in one or more linear equations. The method also includes converting one or more of the linear equations to one or more polynomials and then performing kernel extraction and optimization on one or more of the polynomials. One or more common subexpressions associated with the polynomials are identified in order to reduce one or more of the operations.

Embodiments of the invention may provide various technical advantages. Certain embodiments provide for a significant reduction in operations for an associated processing architecture. This is a result of a new transformation of constant multiplications and algorithms to find common subexpressions involving multiple variables (for the matrix form of linear systems). The technique offers an implementation with a minimal number of additions/subtractions (and/or shifts), in contrast to other techniques, which primarily optimize multiplications with only a single variable at a time. Synthesis results, on a subset of these examples, reflect an implementation with less area and faster throughput in comparison to conventional techniques. Hence, the present invention can achieve a saving in operations, which provides for less power consumption and smaller area configurations. Such an approach may be ideal for the design of digital signal processing hardware.

Other technical advantages of the present invention may be readily apparent to one skilled in the art. Moreover, while specific advantages have been enumerated above, various embodiments of the invention may have none, some, or all of these advantages.

BRIEF DESCRIPTION OF THE DRAWINGS

For a more complete understanding of the present invention and its advantages, reference is now made to the following descriptions, taken in conjunction with the accompanying drawings, in which:

FIG. 7 is a simplified kernel and co-kernel matrix associated with the system; and FIG. 8 is a more detailed illustration of the simplified kernel and co-kernel matrix associated with the system.

DETAILED DESCRIPTION OF THE DRAWINGS

Figures 1, 2, 3:
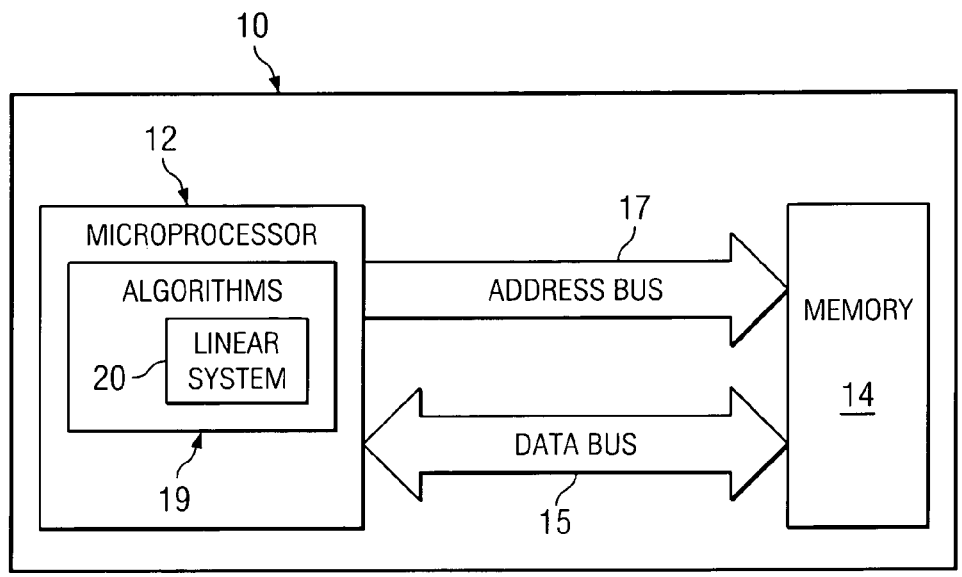
FIG. 1 illustrates a digital signal processor (DSP) system for eliminating common subexpressions according to various embodiments of the present invention.
FIG. 2 is a simplified diagram of a linear system of the system of FIG. 1.
FIG. 3 is a more detailed diagram of the linear system of FIG. 1.

FIG. 1 is a portion of a system 10 that operates in a digital signal processor (DSP) environment. System 10 includes a microprocessor 12 and a memory 14 coupled to each other using an address bus 17 and a data bus 15. Microprocessor 12 includes one or more algorithms 19, which include a linear system 20 that may be inclusive of multiple linear systems where appropriate.

In accordance with the teachings of the present invention, system 10 operates to optimize linear systems 20, which may be used in the signal processing. In general, "linear systems" are widely used in signal processing, for example, in the context of: Discrete Cosine Transform (DCT), Inverse Discrete Cosine Transform (IDCT), Discrete Fourier Transform (DFT), Discrete Sine Transform (DST), and Discrete Hartley Transform (DHT). System 10 performs a common subexpression elimination that involves multiple variables and that is applicable to any of these technologies.

Common subexpression elimination is commonly employed to reduce the number of operations in DSP algorithms, for example after decomposing constant multiplications into shifts and additions. Conventional optimization techniques for finding common subexpressions can optimize constant multiplications with only a single variable at a time and, hence, cannot fully optimize the computations with multiple variables such as those found in a matrix form of linear systems (e.g. DCT, DFT etc.). System 10 transforms these computations such that all possible common subexpressions involving any number of variables can be detected. Heuristic algorithms can then be presented in order to select the best set of common subexpressions.

Thus, system 10 can offer a new transformation of constant multiplications to find common subexpressions involving multiple variables for the matrix form of linear systems. The technique can be used to find common subexpressions in any kind of linear computations, where there are a number of multiplications with constants involving any number of variables. Synthesis results for system 10 yield an implementation with less area and higher throughput, as compared to conventional techniques.

Custom hardware implementations of computationally intensive DSP kernels is a good solution to meet the requirements for latency and power consumption. DSP algorithms generally contain a large number of multiplications with constants. Decomposing these constant multiplications into shifts and additions leads to an efficient hardware implementation. Finding common subexpressions in the set of additions further reduces the complexity of the implementation. Additional details relating to this process are provided below with reference to subsequent FIGURES.

Referring back to FIG. 1, microprocessor 12 may be included in any appropriate arrangement and, further, include algorithms 19 embodied in any suitable form (e.g. software, hardware, etc.). For example, microprocessor 12 may be part of a simple integrated chip, an application specific integrated circuit (ASIC), a field programmable gate array (FPGA), or any other suitable processing object, device, or component. Address bus 17 and data bus 15 are wires capable of carrying data (e.g. binary data). Alternatively, such wires may be replaced with any other suitable technology (e.g. optical radiation, laser technology, etc.) operable to facilitate the propagation of data.

Memory 14 is a storage element operable to maintain information that may be accessed by microprocessor 12. Memory 14 may be a random access memory (RAM), a read only memory (ROM), software, an algorithm, an erasable programmable ROM (EPROM), an electrically erasable programmable ROM (EEPROM), a fast cycle RAM (FCRAM), a static RAM (SRAM), or any other suitable object that is operable to facilitate such storage operations. In other embodiments, memory 14 may be replaced by another processor that is operable to interface with microprocessor 12.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Conventional methods for finding common subexpressions rely on finding common digit patterns in the set of constants that are multiplied by a single variable. The common subexpressions correspond to the common partial products formed during the multiplication of the variable with the constants. Finding all possible common digit patterns can extract all possible common subexpressions when all the constant multiplications are with a single variable, such as in the transformed form of FIR digital filters. Using the same idea for matrix forms of linear systems like DCT, DFT, etc. will not be able to extract common subexpressions involving multiple variables. Hence, system 10 can be used to overcome this shortcoming in offering an effective reduction of operations.

FIG. 2 is a simplified diagram of linear system 20, which includes a matrix. Note that linear system 20 is provided in terms of 'X' and 'Y,' which are linear polynomials (or linear functions). These coefficients are provided in base ten. Furthermore, all equations are linear (i.e. power of variables such as $X^2$ or $Y^3$ do not appear in equations). In this scenario, the input variables (e.g. $X_1$ and $X_2$) are multiplied by some set of constants (5, 7, 4, and 12) to produce resultants (e.g. $Y_1$ and $Y_2$).

Turning to FIG. 3, FIG. 3 is a more detailed diagram of linear system 20. FIG. 3 further illustrates decomposing constant multiplications into shifts and additions, which is reflected by an equation 24. In this example, linear system 20 has two variables $X_1$ and $X_2$. Assume that the constants are in the two's complement representation. The constants in column 1 (5 and 4) are multiplied by $X_1$ and the constants in column 2 (7 and 12) are multiplied by variable $X_2$. Decomposing the constant multiplications into shifts and additions yields an implementation with six shifts and six additions.

Note that multiplication operations are generally expensive in the context of processing. For example, considerable expense could be incurred during the design of a hardware block, as the area will be large. In such a case, the multiplication by a constant number (e.g. 5) can be simplified. Five can be represented as "0101" in a binary format, as is illustrated in FIG. 3. In this example, $Y_1=5X_1+7X_2$. If five is written as 0101 and then multiplied by $X_1$, a person is effectively calculating $4X_1+X_1$.

A summation of selected operations is provided generally at equation 24. Usage of shift and addition or subtraction operations may be performed instead of multiplication. Note that the symbol "<<n" is translated as a shift to the left by n bits. In this box, it is seen that: $Y_1=X_1+X_1<<2+X_2+X_2<<1+X_2<<2$ and $Y_2=X_1<<2+X_2<<2+X_2<<3$. In order to calculate Y1, four additions should be performed, along with three shifts. This is far easier than performing two multiplications and one addition. To calculate Y2, shift and addition operations may be used to produce the resultant function. In the original form, four multiplications and two additions were used to produce the functions, as is illustrated in FIG. 3. However, in the new form, six shifts and six additions are needed, which is far easier than four multiplications. Now, if the new format is used and a design hardware block is developed, its associated area will be smaller. In addition, the power consumption will also be less in such an environment.

Figure 4:
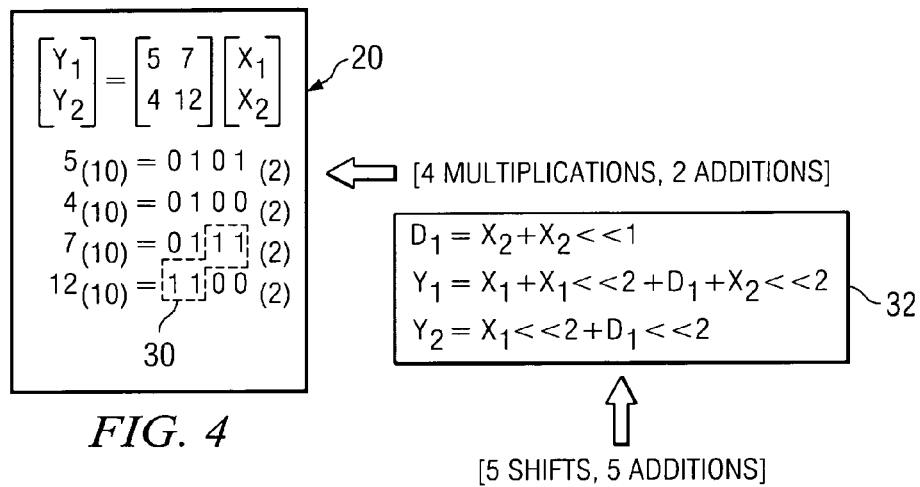
FIG. 4 is yet another more detailed diagram of the linear system of FIG. 1.

FIG. 4 is yet another more detailed diagram of linear system 20. FIG. 4 also reflects an extraction of common bit patterns among constants (multiplying a single variable) and is illustrated by an equation 32. Hence, it is possible to use simpler operations and reduce the number of operations from this improved format. This may be achieved by finding some common internal factors. For example, extracting common bit patterns existing in a single constant may yield an even greater savings in shifts and additions. In FIG. 4, $D_1$ was used after identifying a common factor among 7 and 12 (box 30). The number "11" has been represented twice in this FIGURE. This is a common factor that can be used for purposes of optimization.

Thus, in this example, when identifying common bit patterns in the constants (multiplying the same variable), the pattern "11" is detected between the constants 7 (0111) and 12 (1100), which multiply variable $X_2$. After extracting that common subexpression, the subsequent implementation includes five shifts and five additions, as is illustrated.

Figure 5:
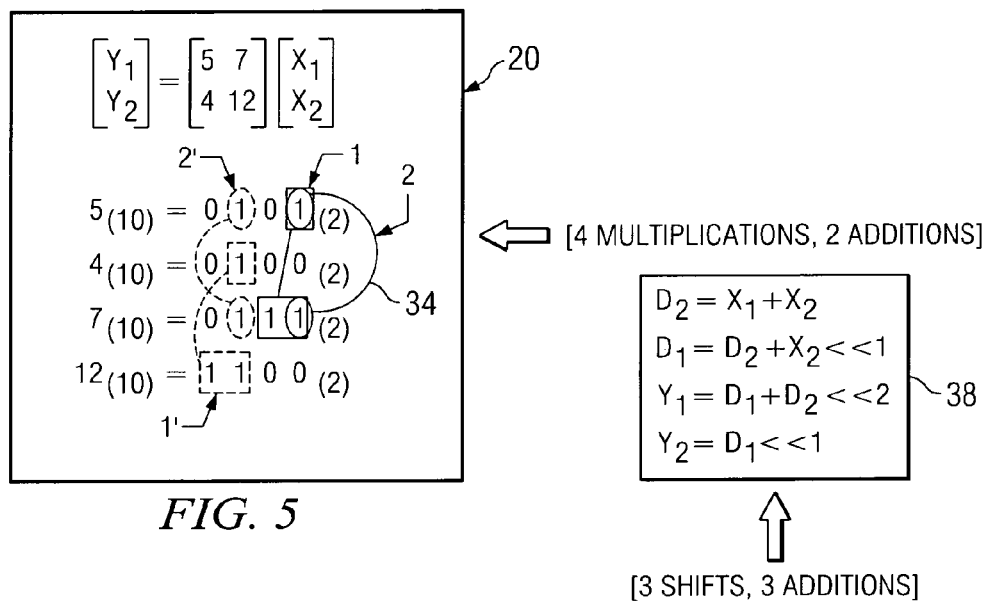
FIG. 5 is still another more detailed diagram of the linear system of FIG. 1.

FIG. 5 is still another more detailed diagram of linear system 20. FIG. 5 shows the ability to extend common subexpressions to include multiple variables, which is illustrated by an equation 38. If the common subexpressions are further extended to include multiple variables, the resulting implementation includes just three additions and three shifts, as is illustrated. Therefore, by extending common subexpressions to include multiple variables, the number of additions has reduced by 40% compared to methods that would extract common subexpressions including only one variable.

Hence, the common factoring can be used again in the case of FIG. 5. FIG. 5 shows extending common subexpression elimination to include multiple variables. An identified region 34 includes two circles, which correspond to $X_1+X_2$. As evidenced by equation 38, in order to calculate $Y_1$, $X_1+X_2$ can be first calculated and used in several places. Therefore, the function corresponding to this pattern can be used to calculate the original linear functions. Stated in mathematical terms, $D_1$ and $D_2$ can be used to calculate $Y_1$ and $Y_2$. In addition, $D_2=X_1+X_2$; $D_1=D_2+X_2$ [shifted to the left one bit]; $Y_1=D_1+D_2$ [shifted to the left two bits]; and $Y_2=D_1$ [shifted left one bit]. These equations may be used in order to optimize the functions $Y_1$ and $Y_2$. The pattern 2 corresponds to D2 and appears twice (2 and 2'). Pattern 1 appears twice as well (1 and 1'). Also, pattern 2 is used in pattern 1.

Thus far, only the binary representations of constants (or coefficients) have been used. For example, it has been shown that $C \times X = \Sigma(X \times L^i)$. In our example, this would translate into: $(14)_{(10)} \times X = (1110)_{(2)} \times X = XL^3 + XL^2 + XL^1$, where the 'L' signifies a shift operation and the subsequent number represents the number of bits to be shifted (e.g. $L^1$=a shift to the left one bit). In these representations, there are only additions, not subtractions.

However, there are other ways of writing this information. For example, Canonical Sign Digit (CSD) representation may be used. Mathematically, this may be expressed as: $C \times X = \Sigma \pm (X \times L^i)$. In terms of our example, CSD could be used to show: $(14)_{(10)} \times X = (1110)_{(2)} \times X = XL^4 - XL^1$. This last part of this equation illustrates the new representation, which shows that $16X-2X=14X$. If this is compared with the original binary representations, where there were 3 terms and 2 additions, an obvious saving is clearly seen. The new expression implicates only 2 terms and 1 operation (subtraction). Hence, the CSD can be more compact than the binary representation. The previous optimization can benefit from the CSD, whereby the number of operations is reduced and the type of operations is also changed.

As for $Y_1$ and $Y_2$, in mathematical terms: $Y_1=_{(1)}X_1+_{(2)}X_1L^2+_{(3)}X_2+_{(4)}X_2L^1+_{(5)}X_2L^2$; and $Y_2=_{(6)}X_1L^2+_{(7)}X_2L^2+_{(8)}X_2L^3$. The number in parenthesis represents the term number that the element represents.

Figure 6:
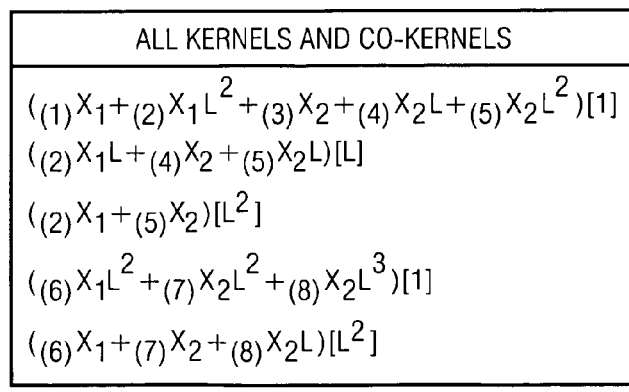
FIG. 6 is a simplified diagram of a kernel and a co-kernel calculation associated with the system.

FIG. 6 is a simplified diagram of a kernel and a co-kernel calculation 50 associated with system 10. In essence, FIG. 6 illustrates the results of an algorithm for the generation of kernels of a set of polynomial expressions. A kernel of a polynomial expression is defined as an expression that has at least one term with a zero power of L. The set of kernels of an expression is a subset of all algebraic divisors of the polynomial expression. The kernels are generated by successively dividing by the least power of L in the expression. The power of L that is used to obtain a kernel is the corresponding co-kernel of the kernel expression.

For example, consider the expression $Y_1$ stated earlier. Since $Y_1$ satisfies the definition of a kernel, $Y_1$ is recorded as a kernel with co-kernel '1'. The minimum non-zero power of L in $Y_1$ is L. Dividing by L we obtain the kernel expression $X_1L+X_2+X_2L$, which is recorded as a kernel with co-kernel L. This expression has L as the minimum non-zero power of L. Dividing by L, the kernel $X_1+X_2$ is obtained with co-kernel $L^2$. In this example, no more kernels are generated and the algorithm terminates. For expression $Y_2$ the kernel $X_1+X_2+X_2L$ with co-kernel $L^2$ is obtained.

The importance of kernels is illustrated by the following theorem. Theorem: there exists a k-term common subexpression if and only if there is a k-term non-overlapping intersection between at least 2 kernels. As a proof of this theorem, first consider the case where all the constant multiplications are with a single variable. Hence, finding common subexpressions is equivalent to finding all common digit patterns among the constants multiplying the variable. According to the kernel generation algorithm, the set of all kernels for a constant (multiplying a variable) corresponds to the set of digit patterns starting from the most significant non-zero digit, and each time adding the next most significant non-zero digit to form a pattern.

For example, consider the constant multiplication $(10-1010-1)*X=-X+XL^2-XL^4+XL^6$ in the example polynomial representation. The set of kernels (and co-kernels) generated are $(XL^2-X)[L^4]$, $(XL^4-XL^2+X)[L^2]$ and $(XL^6-XL^4+XL^2-X)[1]$, which correspond to the digit patterns 10-1, 10-101 and 10-1010-1 respectively. Therefore, it is clear that each non-zero digit except the most significant non-zero digit appears once as the least significant digit in a digit pattern corresponding to a kernel expression. Hence, if there is a common digit pattern consisting of k (k>1) non-zero digits, then there will be at least two digit patterns (corresponding to kernels) such that the least significant digit of the common pattern will be the least significant digit of these two digit patterns, aligning the common subexpression. Thus, an intersection between these two patterns will detect the common subexpression.

Conversely, it is clear that a k-term intersection between kernel expressions indicates a k-term common subexpression only if there are no terms that are covered more than once (overlapping terms) in the intersection. Overlapping terms happen when the kernels in the intersection correspond to the same constant and cover at least one non-zero digit in common. For example, in the pattern 1001001, there are 2 patterns "1001" but they cover one non-zero digit in common.

FIGS. 7 and 8 are simplified kernel and co-kernel matrices associated with system 10. These FIGURES illustrate a matrix transformation, which is used to find kernel intersections. Hence, the set of kernels generated is transformed into a matrix form called the Kernel Intersection Matrix (KIM), to find kernel intersections. There is one row for each kernel generated and one column for each distinct term in the set of kernel expressions. Each term is distinguished by its sign (+/−), variable, and the power of L.

FIG. 7 shows the KIM for our example linear system 20 from its set of kernels and co-kernels shown in a previous FIGURE. The rows are marked with the co-kernel of the kernel which it represents. Each '1' element (i,j) in the matrix represents a term in the original set of expressions, which can be obtained by multiplying the co-kernel in row i with the kernel term in column j. The number in parenthesis represents the term number that the element represents.

Each kernel intersection appears in the matrix as a rectangle. A rectangle is defined as a set of rows and columns such that its elements are '1'. For example, in the matrix illustrated, the row set {1,4} and the column set {1,3,4} together make a rectangle. A prime rectangle is defined as a rectangle that is not contained in any other rectangle.

The value of a rectangle is defined as the number of additions saved by selecting that rectangle (kernel intersection) as a common subexpression and is given by: Value $(R,C)=(R-1)*(C-1)$, where R is the number of rows and C is the number of columns of the rectangle. The value of the rectangle is calculated after removing the appropriate rows and columns to remove overlapping terms. An algorithm for finding a maximal irredundant rectangle (MIR) is then used.

Finding the best set of common subexpressions for the minimum number of additions is equivalent to finding the best set of non-overlapping rectangles in the KIM, which is analogous to the minimum weighted rectangular covering problem in multi-level logic synthesis. The resultant is a simplified set of operations that achieve the same final result as the more complex equation, which was used as an initial starting point.

Turning to FIG. 8, FIG. 8 is a more detailed illustration of the simplified kernel and co-kernel matrix associated with system 10. FIG. 8 illustrates extracting kernel intersections (2nd iteration). There is only one valuable rectangle in this matrix that corresponds to the rows {2,3} and the columns {4,5}, and it has a value 1. This rectangle is selected. No more rectangles are selected in the further iterations and the algorithm terminates and the final set of expressions is provided as equation 38 (identified and discussed above). Thus, the resultant of the operations of system 10 yields a significant reduction in operations, which provides for less power consumption and smaller area configurations. Processing hardware design, in particular, could benefit greatly from such an approach.

Some of the steps illustrated in the preceding FIGURES may be changed or deleted where appropriate and additional steps may also be added to the proposed process. These changes may be based on specific system architectures or particular arrangements or configurations and do not depart from the scope or the teachings of the present invention. It is also critical to note that the preceding description details a number of techniques for reducing operations. While these techniques have been described in particular arrangements and combinations, system 10 contemplates using any appropriate combination and ordering of these operations to provide for decreased operations in linear system 20. As discussed above, identification of the common subexpressions may be facilitated by rectangle covering, ping pong algorithms, or any other process, which is operable to facilitate such identification tasks. Considerable flexibility is provided by the present invention, as any such permutations are clearly within the broad scope of the present invention.

Although the present invention has been described in detail with reference to particular embodiments illustrated in FIGS. 1 through 8, it should be understood that various other changes, substitutions, and alterations may be made hereto without departing from the spirit and scope of the present invention. For example, although the present invention has been described with reference to a number of elements included within system 10, these elements may be rearranged or positioned in order to accommodate any suitable processing and communication architectures. In addition, any of the described elements may be provided as separate external components to system 10 or to each other where appropriate. The present invention contemplates great flexibility in the arrangement of these elements, as well as their internal components. Moreover, the algorithms presented herein may be provided in any suitable element, component, or object. Such architectures may be designed based on particular processing needs where appropriate.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A method for reducing operations in a processing environment, comprising:
   generating one or more binary representations, wherein one or more of the binary representations are included in one or more linear systems that include one or more operations and a plurality of different distinct variables;
   converting one or more of the linear systems to one or more polynomials including the plurality of different distinct variables;
   generating a plurality of kernels from the one or more polynomials;
   generating a matrix of the plurality of kernels;
   performing kernel extraction on the matrix for optimization of the one or more polynomials; and
   identifying one or more common subexpressions associated with the polynomials by extracting common bit patterns among constants multiplying two or more variables of the plurality of different distinct variables in order to reduce one or more of the operations, wherein the identifying is facilitated by rectangle covering.

2. The method of claim 1, wherein one or more of the operations relate to subtraction, addition, shifting, or multiplication.

3. The method of claim 1, wherein one or more of the linear systems are associated with Discrete Cosine Transforms (DCT), Inverse Discrete Cosine Transforms (IDCT), Discrete Fourier Transforms (DFT), Discrete Sine Transforms (DST), or Discrete Hartley Transforms (DHT).

4. The method of claim 1, wherein a Canonical Sign Digit (CSD) representation is used to reduce the operations.

5. The method of claim 1, further comprising:
   identifying one or more of the common subexpressions using a rectangle covering algorithm or a ping pong algorithm.

6. A system for reducing operations in a processing environment, comprising:
   means for generating one or more binary representations, wherein one or more of the binary representations are included in one or more linear systems that include one or more operations and a plurality of different distinct variables;
   means for converting one or more of the linear systems to one or more polynomials including the plurality of different distinct variables;
   means for generating a plurality of kernels from the one or more polynomials;
   means for generating a matrix of the plurality of kernels;
   means for performing kernel extraction and optimization on one or more of the polynomials; and
   means for identifying one or more common subexpressions associated with the polynomials by extracting common bit patterns among constants multiplying two or more variables of the plurality of different distinct variables in order to reduce one or more of the operations, wherein the identifying is facilitated by rectangle covering.

7. The system of claim 6, wherein one or more of the operations relate to subtraction, addition, shifting, or multiplication.

8. The system of claim 6, wherein one or more of the linear systems are associated with Discrete Cosine Transforms (DCT), Inverse Discrete Cosine Transforms (IDCT), Discrete Fourier Transforms (DFT), Discrete Sine Transforms (DST), or Discrete Hartley Transforms (DHT).

9. The system of claim 6, wherein a Canonical Sign Digit (CSD) representation is used to reduce the operations.

10. The system of claim 6, further comprising:
generating a resultant, for one or more of the linear systems, based on the reduction in the operations.

11. Software for reducing operations in a processing environment, the software being embodied in a non-transitory computer readable medium and comprising computer code such that when executed is operable to:
generate one or more binary representations, wherein one or more of the binary representations are included in one or more linear systems that include one or more operations and a plurality of different distinct variables;
convert one or more of the linear systems to one or more polynomials including the plurality of different distinct variables;
perform kernel extraction and optimization on one or more of the polynomials;
generate a plurality of kernels from the one or more polynomials;
generate a matrix of the plurality of kernels; and
identify one or more common subexpressions associated with the polynomials by extracting common bit patterns among constants multiplying two or more variables of the plurality of different distinct variables in order to reduce one or more of the operations, wherein the identifying is facilitated by rectangle covering.

12. The medium of claim 11, wherein one or more of the operations relate to subtraction, addition, shifting, or multiplication.

13. The medium of claim 11, wherein a Canonical Sign Digit (CSD) representation is used to reduce the operations.

14. The medium of claim 11, wherein the code is further operable to:
generate a resultant, for one or more of the linear systems, based on the reduction in the operations.

15. The medium of claim 11, wherein the code is further operable to:
identify one or more of the common subexpressions using a kernel extraction algorithm or a ping pong algorithm.

16. The method of claim 1, wherein identifying one or more common subexpressions comprises identifying a set of non-overlapping rectangles in the matrix.

* * * * *

UNITED STATES PATENT AND TRADEMARK OFFICE
CERTIFICATE OF CORRECTION

PATENT NO. : 7,895,420 B2  Page 1 of 1
APPLICATION NO. : 11/067357
DATED : February 22, 2011
INVENTOR(S) : Farzan Fallah, Anup Hosangadi and Ryan C. Kastner It is certified that error appears in the above-identified patent and that said Letters Patent is hereby corrected as shown below:

On the Title Page
Item (73) Assignee: After "Fujitsu Limited, Kawasaki (JP)" insert -- University of California, Santa Barbara, CA (US) --.

Signed and Sealed this
Nineteenth Day of June, 2012

David J. Kappos
*Director of the United States Patent and Trademark Office*